(12) United States Patent
Fiquette

(10) Patent No.: US 8,973,281 B1
(45) Date of Patent: Mar. 10, 2015

(54) EDGE DISTANCE GAUGE

(71) Applicant: The Boeing Company, Chicago, IL (US)

(72) Inventor: Alan W. Fiquette, Bridgeton, MO (US)

(73) Assignee: The Boeing Company, Chicago, IL (US)

( * ) Notice: Subject to any disclaimer, the term of this patent is extended or adjusted under 35 U.S.C. 154(b) by 285 days.

(21) Appl. No.: 13/649,782

(22) Filed: Oct. 11, 2012

(51) Int. Cl.
*G01B 3/00* (2006.01)
*G01B 3/50* (2006.01)

(52) U.S. Cl.
USPC .......................... 33/671; 33/501.45; 33/555.1

(58) Field of Classification Search
CPC .............. G01B 3/40; G01B 3/48; G01B 3/34; G01B 5/08; G01B 3/38; G01B 5/12; G01B 3/44; G01B 3/20; G01B 5/14; G01B 5/20; G01B 3/205; G01B 3/26; G01B 3/30; G01B 3/32; G01B 3/42; G01B 5/0004; G01B 5/0023; G01B 5/02; G01B 5/204; G01B 5/205; G01B 11/12; G01B 3/46; G01B 5/066; G01B 7/02; G01B 11/105; G01B 21/04; G01B 3/00; G01B 3/36; G01B 3/56; G01B 5/061; G01B 5/207; G01B 5/25; G01B 7/06; G01B 7/28; G01B 7/287; G01B 11/272; G01B 13/00; G01B 13/18; G01B 21/20; G01B 3/002; G01B 3/004; G01B 3/006; G01B 3/008; G01B 3/08; G01B 3/18; G01B 5/00; G01B 5/0025; G01B 5/06; G01B 5/166; G01B 5/201; G01B 7/105; G01B 7/12; G01B 7/14; G01B 7/282; G01B 11/0608; G01B 11/08
USPC .......................................... 33/671, 555.1, 565
See application file for complete search history.

(56) References Cited

U.S. PATENT DOCUMENTS

| | | | | |
|---|---|---|---|---|
| 867,011 | A * | 9/1907 | Bromley | 33/501 |
| 2,664,642 | A * | 1/1954 | Rae | 33/542 |
| 3,046,670 | A * | 7/1962 | Wydra | 33/565 |
| 4,517,747 | A * | 5/1985 | Morin | 33/512 |
| 5,617,644 | A * | 4/1997 | Bonelli | 33/548 |
| 6,047,606 | A * | 4/2000 | Sibole | 73/865.8 |
| 6,279,244 | B1 * | 8/2001 | Kelley | 33/514.1 |
| 7,032,413 | B1 * | 4/2006 | Specktor | 66/1 A |
| 7,845,077 | B1 * | 12/2010 | Alulis et al. | 29/896.412 |
| 2001/0011421 | A1 * | 8/2001 | Bakke et al. | 33/501.45 |

* cited by examiner

*Primary Examiner* — Yaritza Guadalupe-McCall
(74) *Attorney, Agent, or Firm* — Yee & Associates, P.C.

(57) ABSTRACT

A method and apparatus for identifying locations for holes for a stackup of parts. In one illustrative example, a required edge distance for a hole for the stackup of the parts is identified. A measurement tool is selected based on the required edge distance identified for the hole. The measurement tool comprises a circular section having an edge and an indicator centrally located with respect to the edge of the circular section. The edge of the circular section of the measurement tool is associated with a part in the stackup of the parts. A location on the part for a center of the hole for the stackup of the parts is identified using the indicator.

11 Claims, 11 Drawing Sheets

EDGE DISTANCE GAUGE

BACKGROUND INFORMATION

1. Field

The present disclosure relates generally to manufacturing and, in particular, to manufacturing structures using a stackup of parts. Still more particularly, the present disclosure relates to a method and apparatus for identifying a distance to a center of a hole from the edges of parts in a stackup of parts.

2. Background

Manufacturing products such as vehicles may be a complex process. For example, manufacturing an aircraft may involve fabricating various components and subassemblies. These components and subassemblies may be integrated to form the aircraft.

As one illustrative example, different components may be assembled to form a wingbox. Skin panels may then be attached to the wingbox to form a wing for an aircraft. In another illustrative example, different parts may be connected to each other to form a frame for a fuselage of an aircraft. Skin panels, stringers, and other components may then be positioned relative to the frame to cover the frame and form the fuselage.

These and other types of operations involved in manufacturing a vehicle, such as an aircraft, often involve positioning parts relative to each other and interconnecting those parts. In some cases, positioning the parts relative to each other includes overlapping at least some portions of the parts to form a stackup of parts. As used herein, a stackup of parts may also be referred to as a workpiece.

The different parts in a stackup of parts may be connected to each other using fastener systems. Typically, a hole is drilled in two or more parts in a stackup of parts. A fastener system may then be installed in the hole to connect the parts to each other. The fastener system may include any number of components such as, for example, without limitation, a bolt, a nut, a screw, a rivet, and/or other types of components.

The location in which the hole is to be drilled may vary depending on a number of factors. These factors may include, for example, without limitation, the types of parts into which the hole is to be drilled, the material composition of these parts, the design for the structure to be formed using the stackup of parts, and/or other factors.

In some cases, the location of the hole may depend on the size of the fastener system being installed in the hole. For example, requirements may be present for the minimum distance needed between the center of the hole and an edge of the part in the stackup of parts into which the hole is to be drilled. The distance between the center of the hole and the edge of the part may be referred to as an "edge distance". The minimum edge distance required may depend on, for example, the size of the fastener system to be installed in the hole, the size of the hole to be formed, and/or other factors.

A human operator may identify the location for the hole based on the minimum edge distance required using a tool such as, for example, a ruler. However, since thousands of holes may need to be drilled in stackups of parts to form assemblies and subassemblies of an aircraft, identifying and marking the locations of such holes by scrupulously measuring the edge distances thereof with a ruler may be extremely time-consuming and cumbersome, especially when visual access to the parts is limited.

Using a ruler to measure edge distance requires effort and concentration from the operator. As a result, fatigue and associated misidentifications of locations for holes may occur. Furthermore, when a hole is to be drilled in a part having a corner or a projection, multiple measurements may need to be made using a ruler to ensure that the center of the hole is formed at the required edge distance from all edges of such corner or projection.

SUMMARY

Accordingly, it would be desirable to provide a method and apparatus that address at least some of the issues discussed above and deliver other advantages.

In one illustrative example, a required edge distance for a hole for a stackup of parts is identified using a measurement tool or gauge selected based on the required edge distance identified for the hole. The measurement tool comprises a circular section having an edge and an indicator centrally located with respect to the edge of the circular section. The edge of the circular section of the measurement tool is associated with an edge of a part in the stackup of the parts in such a way that the two edges are coterminous at a single point when viewed along a direction in which the parts in the stackup of parts are stacked. The above-described association between the edge of the part and the edge of the circular section of the measurement tool may be accomplished visually, in a tactile manner, or by abutting both edges against a surface having no curvature in the direction in which the parts in the stackup of parts are stacked. A location on the part for a center of the hole for the stackup of the parts is identified using the indicator.

In another illustrative example, a gauge comprises an elongate member, a circular section, and an indicator. The elongate member has a first end and a second end. The circular section has an edge and is coupled to the first end of the elongate member. The indicator is located centrally with respect to the edge of the circular section.

The features and functions of one or more aspects of the disclosed method and apparatus can be achieved independently in various embodiments of the present disclosure or may be combined in yet other embodiments, as will become apparent after consideration of the ensuing description, the accompanying drawings, and the appended claims. The drawings are provided for illustrative purposes only and are not intended to limit the scope of the present disclosure.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of the present disclosure when read in conjunction with the accompanying drawings, wherein:

DETAILED DESCRIPTION

The illustrative examples recognize and take into account one or more different considerations. For example, the illustrative examples recognize and take into account that the minimum distance required from the center of a hole to any edge of a part may depend on the size of the hole, the shape of the hole, the size of a fastener system to be installed in the hole, and/or other types of factors. For example, design or manufacturing rules may specify that the center of a particular hole must be at least one inch from the edge of a part in a stackup of parts. In other words, the particular hole may require a minimum edge distance of no less than one inch.

The illustrative examples provide a method and apparatus for identifying locations for holes for a stackup of parts. In one illustrative example, a required edge distance for a hole for the stackup of parts is identified. A measurement tool or gauge is selected based on the required edge distance specified for the hole. The measurement tool comprises a circular section having an edge and an indicator centrally located with respect to the edge of the circular section. The edge of the circular section of the measurement tool is associated with a part in the stackup of the parts. A location on the part for a center of the hole for the stackup of parts is identified using the indicator.

In this manner, a hole may be drilled in the stackup of parts based on the identification of the center of the hole. Alternatively, the center of the hole thus identified may be compared to a hole already drilled in the stackup of parts.

Figure 1:
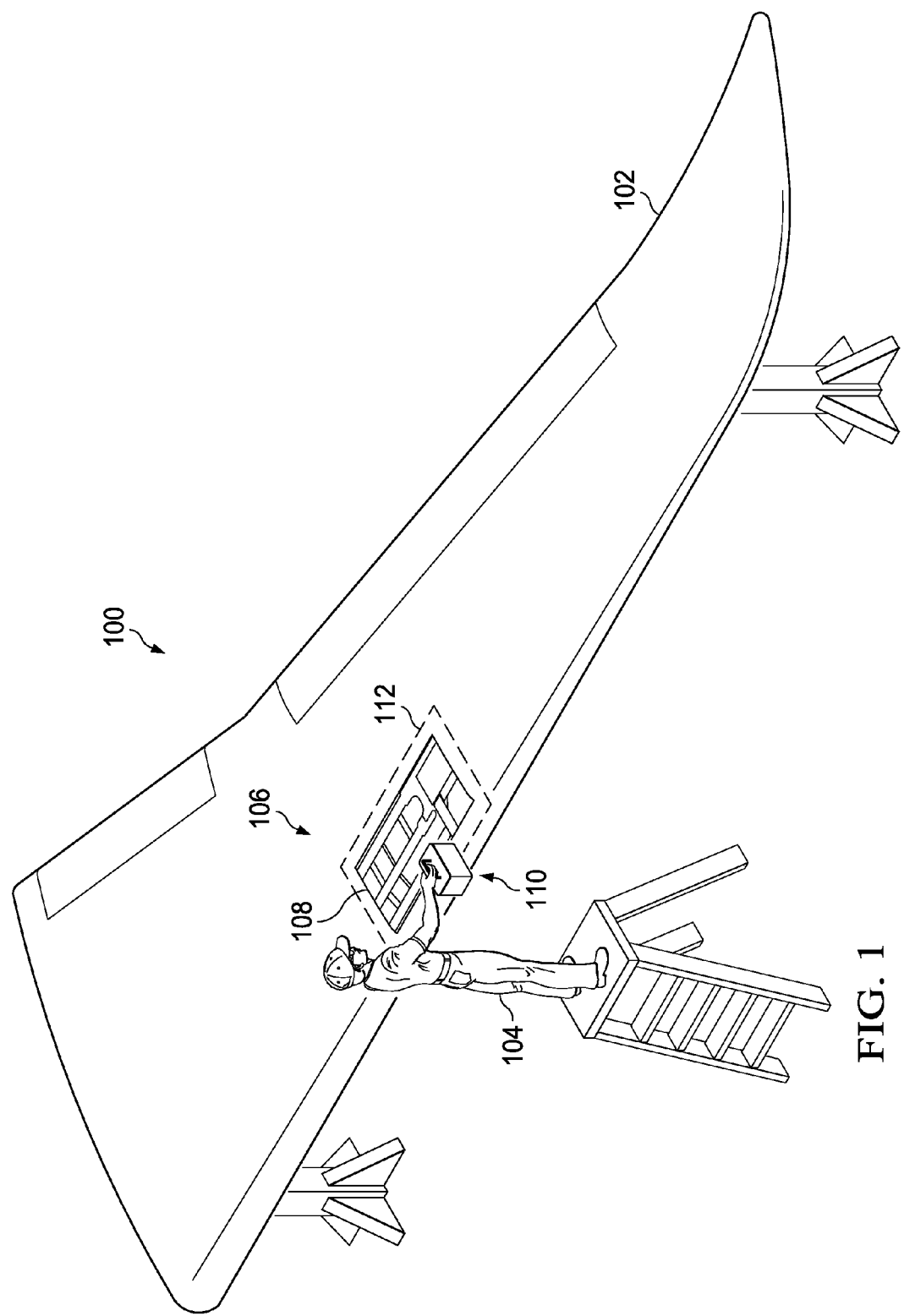
FIG. 1 is an illustration of a manufacturing environment in accordance with an illustrative example.

With reference now to the figures, and in particular, with reference to FIG. 1, an illustration of a manufacturing environment is depicted in accordance with an illustrative example. As depicted, wing 102 is being assembled in manufacturing environment 100.

In this illustrative example, operator 104 identifies locations for holes for stackup of parts 106 in wing 102. Stackup of parts 106 may be, e.g., parts that form a portion of fuel tank 108 in wing 102.

Operator 104 may perform operations on stackup of parts 106 using set of tools 110 in section 112. Set of tools 110 may include one or more tools in accordance with an illustrative example. Set of tools 110 may include, for example, without limitation, a drill, one or more measurement tools, and/or other types of tools.

The operations performed using set of tools 110 may include, for example, without limitation, identifying the locations for holes to be drilled into stackup of parts 106 and drilling these holes. As used herein, identifying the location for a hole comprises identifying a location for the center of the hole.

Once these holes are drilled, fastener systems may be installed in these holes to connect the parts in stackup of parts 106 to each other. Section 112 is illustrated and described in more detail below.

Figure 2:
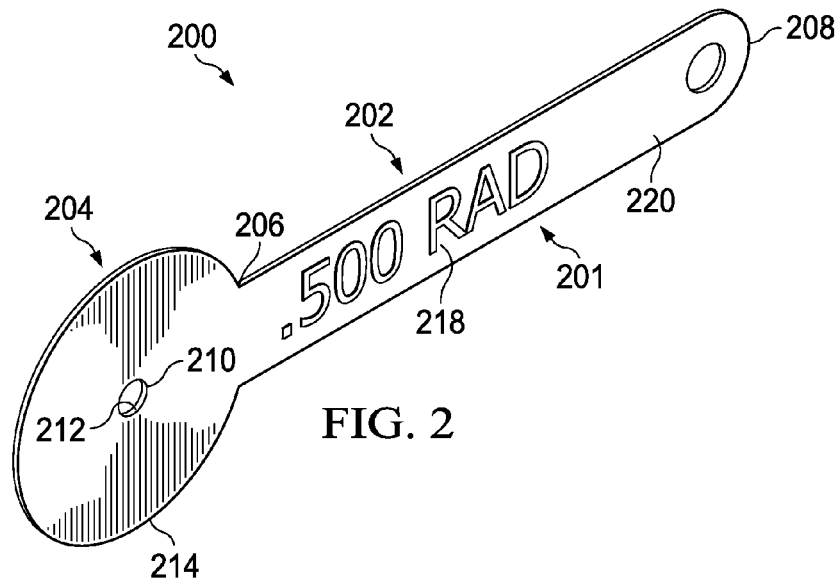
FIG. 2 is an illustration of an isometric view of a measurement tool in accordance with an illustrative example.
Figure 2A:
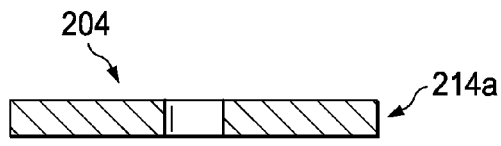
FIGS. 2a-2d are illustrations of different cross-sectional profiles for the circular section of a measurement tool in accordance with an illustrative example.
Figure 2B:
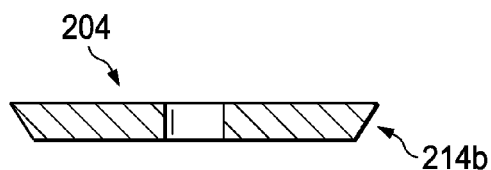
Figure 2C:
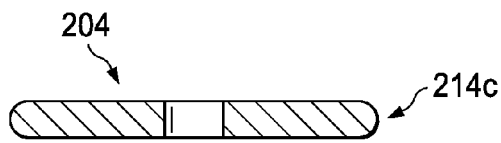
Figure 2D:

Turning now to FIG. 2, an illustration of an isometric view of a measurement tool is depicted in accordance with an illustrative example. In this depicted example, an isometric view of measurement system 200 is depicted. In this particular example, measurement system 200 is comprised of measurement tool 201 or gauge. Measurement tool 201 is an example of a tool in set of tools 110 in FIG. 1 that may be used to identify the location of a hole to be drilled in stackup of parts 106 in FIG. 1.

As depicted, measurement tool 201 is comprised of elongate member 202 and circular section 204. In this illustrative example, elongate member 202 has first end 206 and second end 208. Circular section 204 is located at first end 206.

In particular, circular section 204 is coupled with elongate member 202 at first end 206. When one component is "coupled" with another component, the association is a physical association in the depicted examples. A first component, such as, for example, elongate member 202, may be coupled with a second component, such as, for example, circular section 204, by being secured to the second component, bonded to the second component, mounted to the second component, welded to the second component, fastened to the second component, and/or connected to the second component in some other suitable manner. The first component may also be monolithic with the second component.

The first component may also be coupled with the second component using a third component. The first component may also be considered to be coupled with the second component by being formed as part of and/or an extension of the second component.

In this illustrative example, circular section 204 and elongate member 202 may be two portions of the same piece. In other words, circular section 204 and elongate member 202 may be integrally formed as a unit. Of course, in other illustrative examples, circular section 204 and elongate member 202 may be two pieces that have been joined together.

Circular section 204 of measurement tool 201 has edge 214 in this depicted example. Further, measurement tool 201 includes indicator 210 that is centrally located with respect to edge 214 of circular section 204.

Indicator 210 takes the form of hole 212 in this illustrative example. As depicted, hole 212 is centrally located with respect to edge 214 of circular section 204. In other words, hole 212 is located in the center of circular section 204. In one example, hole 212 has a circular shape and has a radius of about 0.094 inches to facilitate accurate marking of the center of the hole to be drilled in the stackup of parts.

Alternatively, indicator 210 may be implemented as, for example, two intersecting slots, wherein the intersection of the two slots is at the center of circular section 204, providing a convenient way to mark the center of the hole to be drilled in the stackup of parts using crosshair-type markings.

Circular section 204 includes edge 214 having a cross-sectional profile, at least a portion of which defines the maximum radius of circular section 204. As illustrated in FIGS. 2a-2d, edge 214 may have straight cross-sectional profile 214a, oblique cross-sectional profile 214b, arcuate cross-sectional profile 214c, angular cross-sectional profile 214d, or any combination thereof.

Additionally, measurement tool 201 includes identifier 218. As depicted, identifier 218 is located on surface 220 of measurement tool 201. In particular, identifier 218 is located on surface 220 of elongate member 202. Exemplary identifier 218 of FIG. 2 indicates that the radius of circular section 204 with respect to edge 214 is about 0.500 inches.

Figure 3:
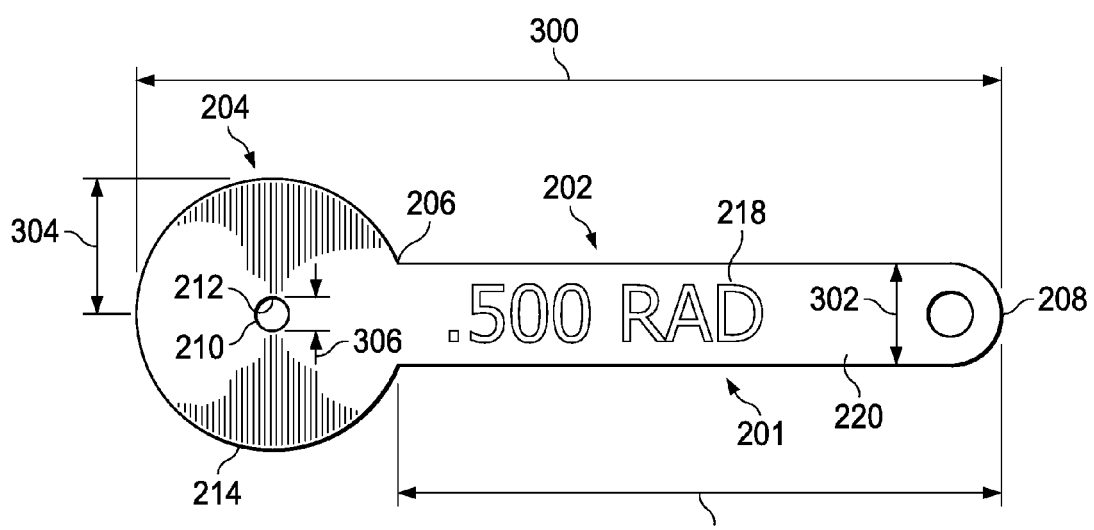
FIG. 3 is an illustration of a planar view of a measurement tool in accordance with an illustrative example.

Turning now to FIG. 3, an illustration of a planar view of measurement tool 201 of FIG. 2 is depicted in accordance with an illustrative example. In this illustrative example, measurement tool 201 has overall length 300. Length 300 may be, for example, about 6 inches. The thickness of measurement tool 201 is about 0.02 inches. If the thickness of the measurement tool exceeds about 0.075 inches, hole 212 may be countersunk to facilitate the marking of the center of the hole to be drilled in the stackup of parts.

Elongate member 202 of measurement tool 201 may have length 301 and width 302. In this illustrative example, length 301 may be about 3.5 inches. Width 302 may be about 0.375 inches in this example.

Circular section 204 has maximum radius 304 defined by at least a portion of the cross-sectional profile of edge 214. In this illustrative example, radius 304 is about 0.500 inches, as identified by identifier 218.

Based on radius 304 of circular section 204, measurement tool 201 may be selected for use in identifying a location for a hole, which is to be drilled in stackup of parts 106, that requires an edge distance of no less than about 0.500 inches.

The edge distance required for the hole may be based on various regulations or standards set for the hole and/or a fastener system to be installed in the hole. For example, the edge distance required for the hole may be based on the size of the hole to be formed, the shape of the hole to be formed, a type of fastener system to be installed in the hole, a size of a fastener system to be installed in the hole, the material composition of the one or more parts in stackup of parts 106 into which the hole is to be drilled, and/or other factors.

In one illustrative example, edge 214 of circular section 204 of measurement tool 201 may be associated with an edge of a part in stackup of parts 106. In particular, circular section 204 of measurement tool 201 may be positioned over the surface of the part such that edge 214 of circular section 204 is coterminous with the edge of the part at a single point when viewed along a direction in which the parts in stackup of parts 106 are stacked. The above-described association between the edge of the part and the edge of the circular section 204 may be accomplished visually, in a tactile manner, or by abutting both edges against a surface having no curvature in the direction in which the parts in stackup of parts 106 are stacked.

In other words, when the edge distance required for a hole must be determined precisely, circular section 204 of measurement tool 201 may be positioned over the surface of the part such that edge 214 of circular section 204 is substantially tangent to the edge of the part. More specifically, circular section 204 may be positioned over the surface of the part such that edge 214 coterminous with the edge of the part without extending past the edge of the part.

Once edge 214 is substantially tangent to the edge of the part, indicator 210 indicates the location on the part at which the center of the hole may be formed. In particular, hole 212 may indicate the location on the surface of the part at which the hole is to be drilled. This location is about 0.500 inches away from the edge of the part, which is substantially equal to the radius of circular section 204. In this manner, the precise edge distance may be measured using measurement tool 201 without needing to read the markings on a ruler.

Additionally, in this illustrative example, hole 212 may be large enough to allow a marking tool to be inserted into hole 212. An operator may insert a marking tool such as, for example, without limitation, a marker, a pen, a pencil, or some other type of writing instrument or marking device, into hole 212 with circular section 204 placed on the surface of the part to mark the location for the center of the hole.

In some illustrative examples, a laser pointing device may be used to mark the location for the center of the hole. Once the location of the hole to be drilled is identified with a point of light, the laser pointing device may be maintained in a fixed position until a hole at the location identified by the point of light is drilled. Using a laser device may allow the part to be marked without causing any undesired inconsistencies on the surface of the part.

In another illustrative example, the edge distance required for the hole may be a minimum edge distance. Accordingly, circular section 204 of measurement tool 201 may be positioned over the surface of the part such that edge 214 of circular section 204 is within the edge of the part. In other words, any location on the part indicated by indicator 210 for which edge 214 of circular section 204 does not extend past the edge of the part may be marked.

The circular shape of circular section 204 may allow a location for a hole to be easily identified at the corner of a part. For example, edge 214 of circular section 204 may be positioned over the surface of a part at a corner of the part such that edge 214 is substantially tangent to the two edges of the part that form this corner. In this illustrative example, the two edges of the corner may form a substantially perpendicular angle. However, in other examples, the two edges may form some other type of angle, depending on the implementation.

Hole 212 may indicate a location on the surface of the part that is about 0.500 inches away from each of the edges at the corner. This location may be identified as the location for the center of the hole to be drilled. In this manner, a single measurement using measurement tool 201 may be used to identify a location for the center of the hole.

Using measurement tool 201 may reduce the time and effort needed to identify the location for a center of the hole as compared to using a ruler. For example, in some cases, using a ruler may require performing at least two measurements as compared to simply associating the edges of circular section 204 of measurement tool 201 with the edges of a part of the stackup of parts.

Of course, in some illustrative examples, a hole to be drilled may require a different edge distance than about 0.500 inches. In these examples, a different measurement tool may need to be used to identify a location for the center of this hole.

Figure 4:
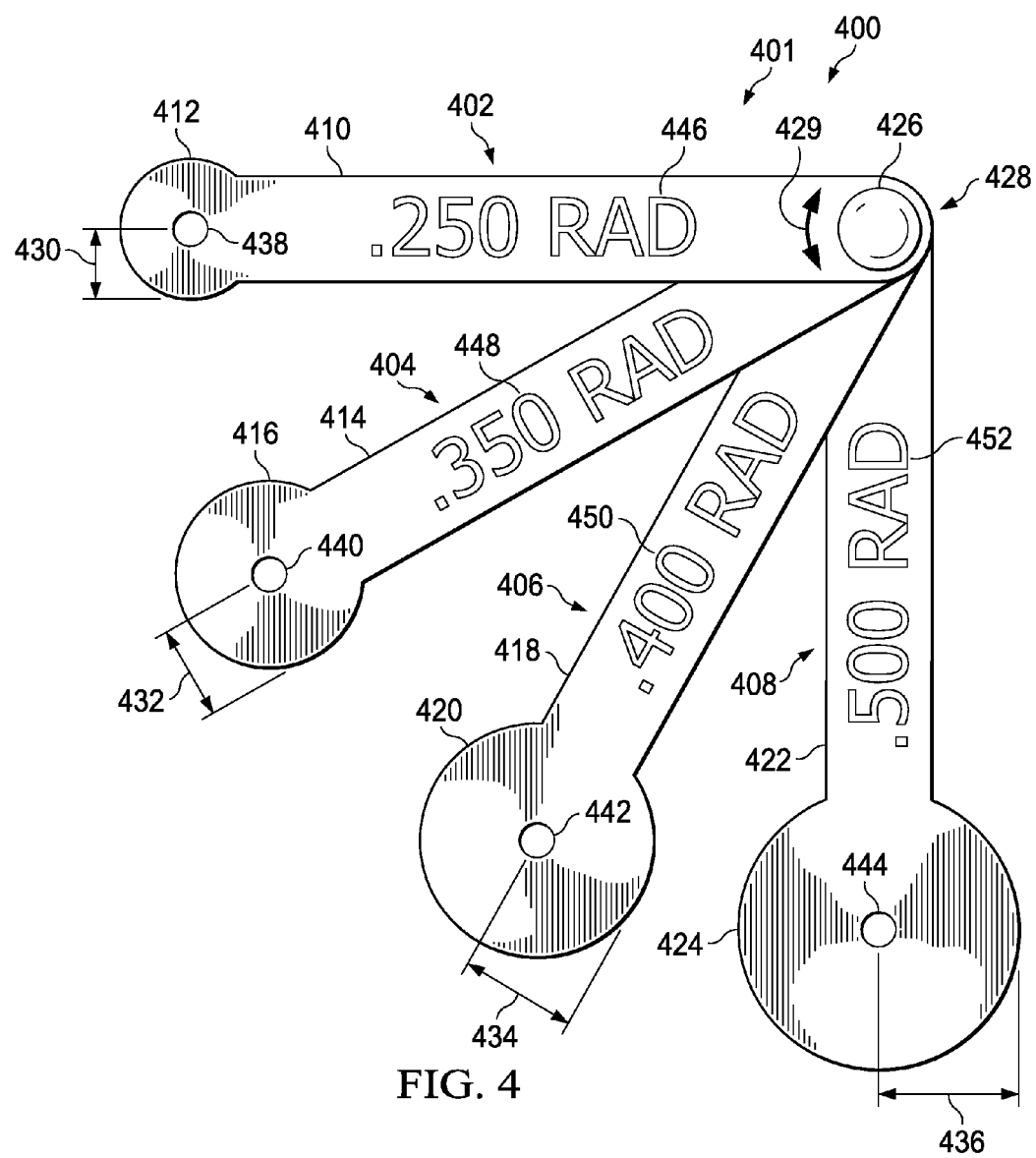
FIG. 4 is an illustration of a measurement system for hole placement in accordance with an illustrative example.

Turning now to FIG. 4, an illustration of a measurement system for hole placement is depicted in accordance with an illustrative example. In this illustrative example, measurement system 400 includes set of measurement tools 401. As depicted, set of measurement tools 401 includes measurement tool 402, measurement tool 404, measurement tool 406, and measurement tool 408.

As depicted, measurement tool 402 has elongate member 410 and circular section 412. Measurement tool 404 has elongate member 414 and circular section 416. Measurement tool 406 has elongate member 418 and circular section 420.

Measurement tool 408 has elongate member 422 and circular section 424. In this illustrative example, measurement tool 402, measurement tool 404, measurement tool 406, and measurement tool 408 are pivotally connected to each other by fastener 426 at ends 428. In other words, each of these measurement tools may be rotated about fastener 426 in the direction of arrow 429.

In this illustrative example, circular section 412 of measurement tool 402 has first radius 430. First radius 430 is about 0.250 inches, as indicated by identifier 446 located on elongate member 410. Circular section 416 of measurement tool 404 has second radius 432. Second radius 432 is about 0.350 inches, as indicated by identifier 448 on elongate member 414.

Further, circular section 420 of measurement tool 406 has third radius 434. Third radius 434 is about 0.400 inches, as indicated by identifier 450 on elongate member 418. Circular section 424 of measurement tool 408 has fourth radius 436. Fourth radius 436 is about 0.500 inches, as indicated by identifier 452 located on elongate member 422.

In this manner, each measurement tool in measurement system 400 has a different circular section with a different radius. In these illustrative examples, first radius 430, second radius 432, third radius 434, and fourth radius 436 may be set based on known requirements for edge distances.

In this illustrative example, identifier 446, identifier 448, identifier 450, and identifier 452 identify the radii of circular section 412, circular section 412, circular section 412, and circular section 412, respectively. However, in other illustrative examples, the identifier on another measurement tool may identify the diameter of the corresponding circular section of that measurement tool.

As depicted, circular section 412 has hole 438 located centrally in circular section 412. Circular section 416 has hole 440 located centrally in circular section 416. Circular section 420 has hole 442 located centrally in circular section 420. Circular section 424 has hole 444 located centrally in circular section 424. Hole 438, hole 440, hole 442, and hole 444 may be used to identify locations for the centers of holes to be drilled when the corresponding circular sections have been positioned relative to the edges of parts, as described above. Further, hole 438, hole 440, hole 442, and hole 444 may be configured to receive marking tools that may be used to mark the locations identified for the centers of the holes to be drilled.

The illustrations of measurement system 200 in FIGS. 2-3 and measurement system 400 in FIG. 4 are not meant to imply limitations to the manner in which measurement tools and measurement systems may be implemented in accordance with an illustrative example. For example, elongate member 202 may be curved instead of substantially straight as depicted in FIGS. 2-3.

As another example, although four measurement tools are illustrated in measurement system 400, other numbers of measurement tools may be present in a measurement system. For example, measurement system 400 may be implemented using two measurement tools, five measurement tools, ten measurement tools, or some other number of measurement tools.

Further, measurement tool 402, measurement tool 404, measurement tool 406, and measurement tool 408 may be connected to each other in measurement system 400 with a connector system other than fastener 426. For example, a plastic tie, a chain, or some other type of connector system may be used to connect ends 428 to each other in measurement system 400. Alternatively, the measurement tools may be contained in a carrying case or a pouch without being connected.

Figure 5:
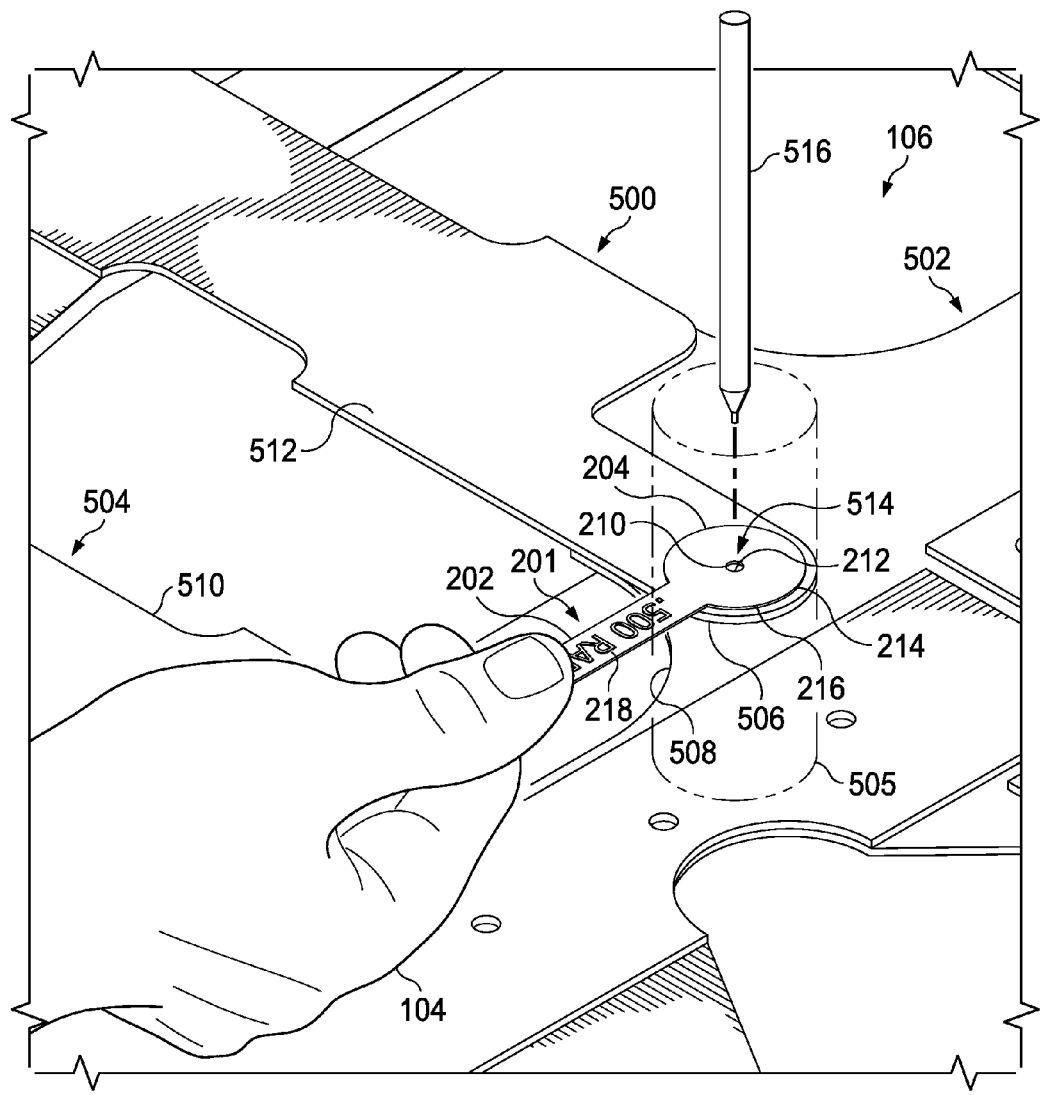
FIG. 5 is an illustration of an identification of a location for a hole using a measurement tool in accordance with an illustrative example.

With reference next to FIG. 5, an illustration of an identification of a location for a hole using a measurement tool is depicted in accordance with an illustrative example. In this illustrative example, a more detailed view of section 112 from FIG. 1, including stackup of parts 106 in fuel tank 108, is seen.

As depicted, stackup of parts 106 includes part 500, part 502, and part 504. Part 500, part 502, and part 504 are aligned with each other as desired in this illustrative example. A hole may need to be drilled in part 500, part 502, and part 504 to connect these parts to each other.

Prior to this hole being drilled, identifying a location for the hole may be important with respect to the design of fuel tank 108 in FIG. 1. In particular, a location for the hole in which the hole has a required minimum edge distance may need to be identified to ensure, for example, the structural integrity of fuel stackup of parts 106 in fuel tank 108.

For example, a first hole drilled in part 500 and part 502 may be required to have a minimum edge distance with respect to edge 506 of part 500, edge 508 of part 502, and edge 510 of part 504.

In this illustrative example, operator 104 uses measurement tool 201 of FIGS. 2-3 to identify a location for a hole that is to be drilled in part 500, part 502, and part 504 within virtual volume 505. The hole that is to be drilled may have a required minimum edge distance. This minimum edge distance may be, for example, about 0.500 inches.

Measurement tool 201 may be selected by operator 104 based on identifier 218 located on measurement tool 201. Identifier 218 indicates that the radius of circular section 204 is equal to the minimum edge distance required for the hole. Thus, operator 104 may select measurement tool 201 for use.

As depicted, circular section 204 of measurement tool 201 is placed on surface 512 of part 500. In particular, circular section 204 is placed on surface 512 of part 500 within virtual volume 505 such that edge 214 of circular section 204 is associated with edge 506 of part 500. In this illustrative example, circular section 204 is associated with edge 506 by being completely contained within edge 506 of part 500 and not extending past edge 506 of part 500.

Circular section 204 may be placed anywhere on surface 512 of part 500 in virtual volume 505 in which circular section 204 is completely contained within edge 506 of part 500. As depicted, a portion of part 500 extends past edge 516 of circular section 204 in this example. However, in other illustrative examples, circular section 204 may be positioned such that edge 516 of circular section 204 is substantially tangent to edge 506 of part 500 without any portion of circular section 204 extending past edge 506 of part 500.

The position of hole 212 in circular section 204 for any placement of circular section 204 wherein circular section 204 is completely contained within edge 506 of part 500 indicates a potential location for the center of the hole that is to be drilled. This potential location for the center of the hole ensures that the hole will have the minimum edge distance required with respect to edge 506 of part 500.

Edge 508 of part 502 extends past edge 506 of part 500 and is outside of virtual volume 505, intersecting the stackup of the parts. Virtual volume 505 has a symmetry axis oriented in the direction that the parts in the stackup of parts are stacked and concentric with the hole to be drilled. The radius of virtual volume 505 is greater than or equal to that of circular section 294. Consequently, the potential location for the center of the hole is a location in which the hole will also have the minimum edge distance required with respect to edge 508 of part 500.

In this illustrative example, hole 212 in circular section 204 of measurement tool 201 indicates that location 514 may be a location for a center of the hole. For example, a drill bit may be centered at location 514 and used to drill the hole.

In this illustrative example, marking tool 516 may be inserted through hole 212 in circular section 204 of measurement tool 201 and used to generate a mark (not shown in this view) on surface 512 of part 500. Marking tool 516 is a marker in this illustrative example. However, in other illustrative examples, marking tool 516 may be a pen, a pencil, or a tool with a sharp point, or some other type of marking tool.

In this manner, using a ruler to measure the distance from edge 506 of part 500 to identify location 514 may be avoided through the use of measurement tool 201. With measurement tool 201, reading markings on a ruler becomes unnecessary. Instead, operator 104 may rely on whether edge 214 of circular section 204 falls within edge 506 of part 500 and edge 508 of part 502.

Figure 6:
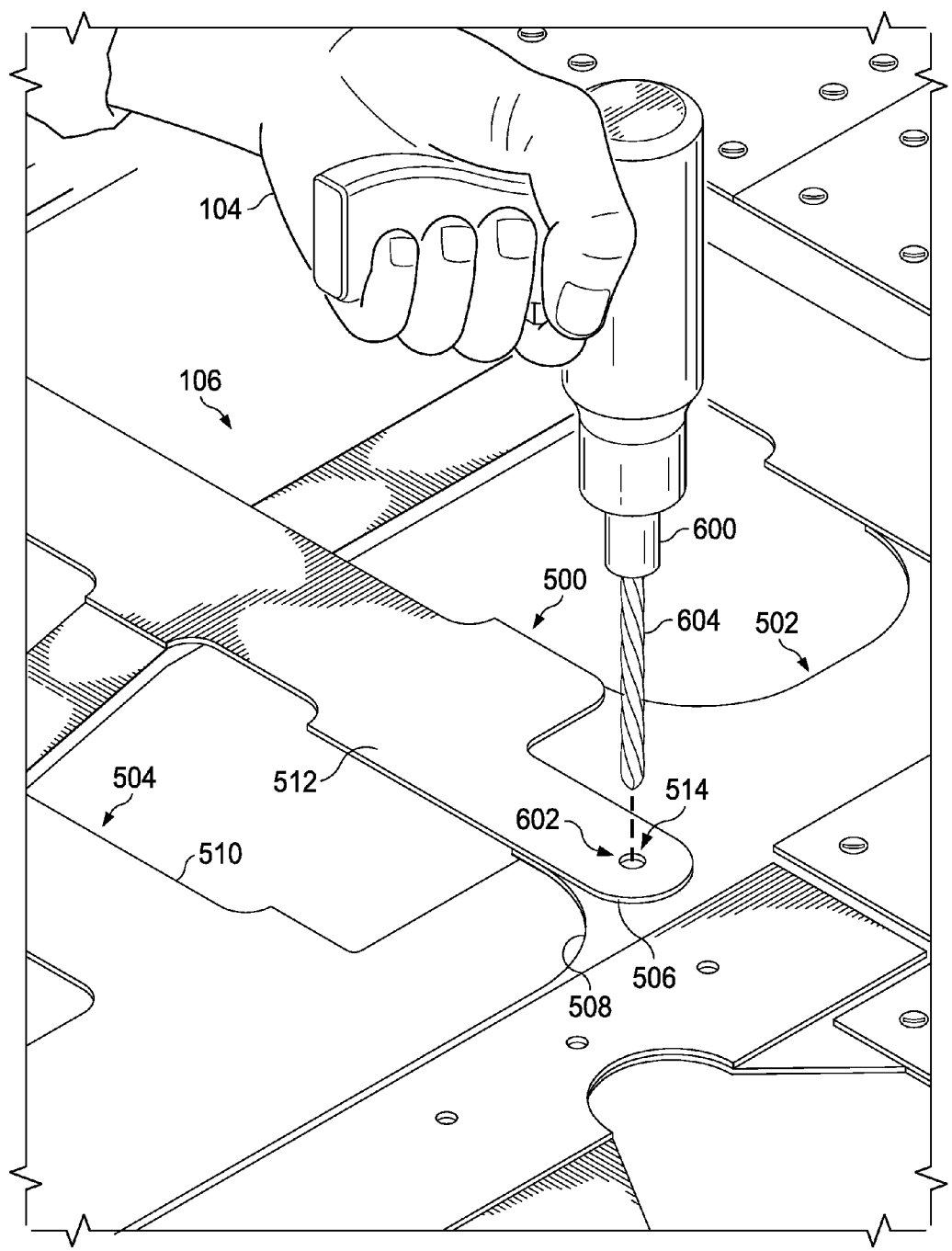
FIG. 6 is an illustration of a drilling of a hole in accordance with an illustrative example.

Turning now to FIG. 6, an illustration of a drilling of a hole is depicted in accordance with an illustrative example. In FIG. 6, drill 600 may be used to drill hole 602 into stackup of parts 106. Hole 602 extends through part 500, part 502, and part 504. Hole 602 is configured to receive a fastener system that may be used to connect part 500, part 502, and part 504 to each other within stackup of parts 106.

In this illustrative example, drill bit 604 of drill 600 may be positioned at location 514 on part 500 marked by marking tool 516 in FIG. 5 to drill hole 602. In this manner, hole 602 may be formed at location 514. In particular, hole 602 may be formed such that a center of hole 602 is located at location 514 within selected tolerances.

Figure 7:
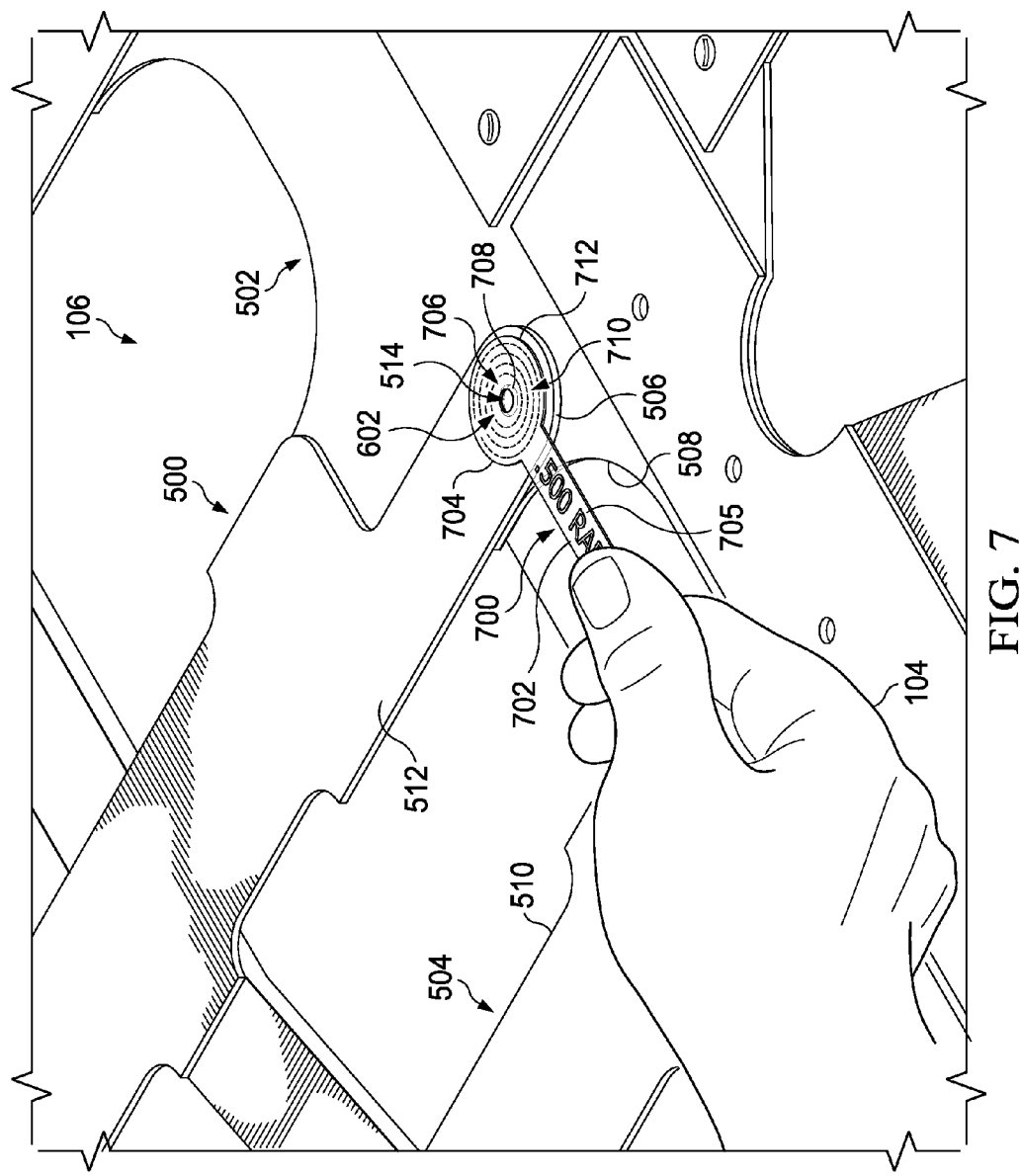
FIG. 7 is an illustration of an edge distance check performed on a hole in accordance with an illustrative example.

Turning now to FIG. 7, an illustration of an edge distance check performed on a hole is depicted in accordance with an illustrative example. In this illustrative example, measurement tool 700 may be used to verify that hole 602 from FIG. 6 has the required minimum edge distance from edge 506 of part 500, edge 508 of part 502, and edge 510 of part 504. Measurement tool 700 is selected for use based on the required minimum edge distance.

Measurement tool 700 comprises elongate member 702 and circular section 704. Circular section 704 has a radius of about 0.500 inches, as identified by identifier 705. Circular section 704 also has indicator 706. Indicator 706 takes the form of hole 708.

In this illustrative example, measurement tool 700 is comprised of a material that is transparent or translucent. For example, without limitation, measurement tool 700 may be comprised of fiberglass, plastic, glass, a transparent composite material, or some other type of transparent or translucent material.

As one illustrative example, measurement tool 700 may be used to ensure that hole 602 has the required minimum edge distance from edge 506 of part 500. Measurement tool 700 has concentric circle markings 710 that may be used to position circular section 704 over hole 602. Concentric circle markings 710 are circles that are substantially centered around hole 708 in circular section 704.

Circular section 704 of measurement tool 700 may be positioned over hole 602 such that at least one of concentric circle markings 710 substantially aligns with an outer edge of hole 602. Once circular section 704 has been placed over part 500 such that one of concentric circle markings 710 is substantially aligned with the outer edge of hole 602, operator 104 may determine whether any portion of edge 712 of circular section 704 extends past edge 506 of part 500.

In other words, operator 104 may determine whether circular section 704 is completely contained within edge 506 of part 500. A determination that circular section 704 is completely contained within edge 506 of part 500 confirms that the center of hole 602 has a distance from edge 506 of part that is at least the required minimum edge distance.

Although measurement tool 700 was described in the context of verifying that existing hole 602 has the required minimum edge distance from edge 506 of part 500, measurement tool 700 may also be used to identify the location for the center of a hole to be drilled, as previously described, for example, with reference to FIG. 5.

Figure 8:
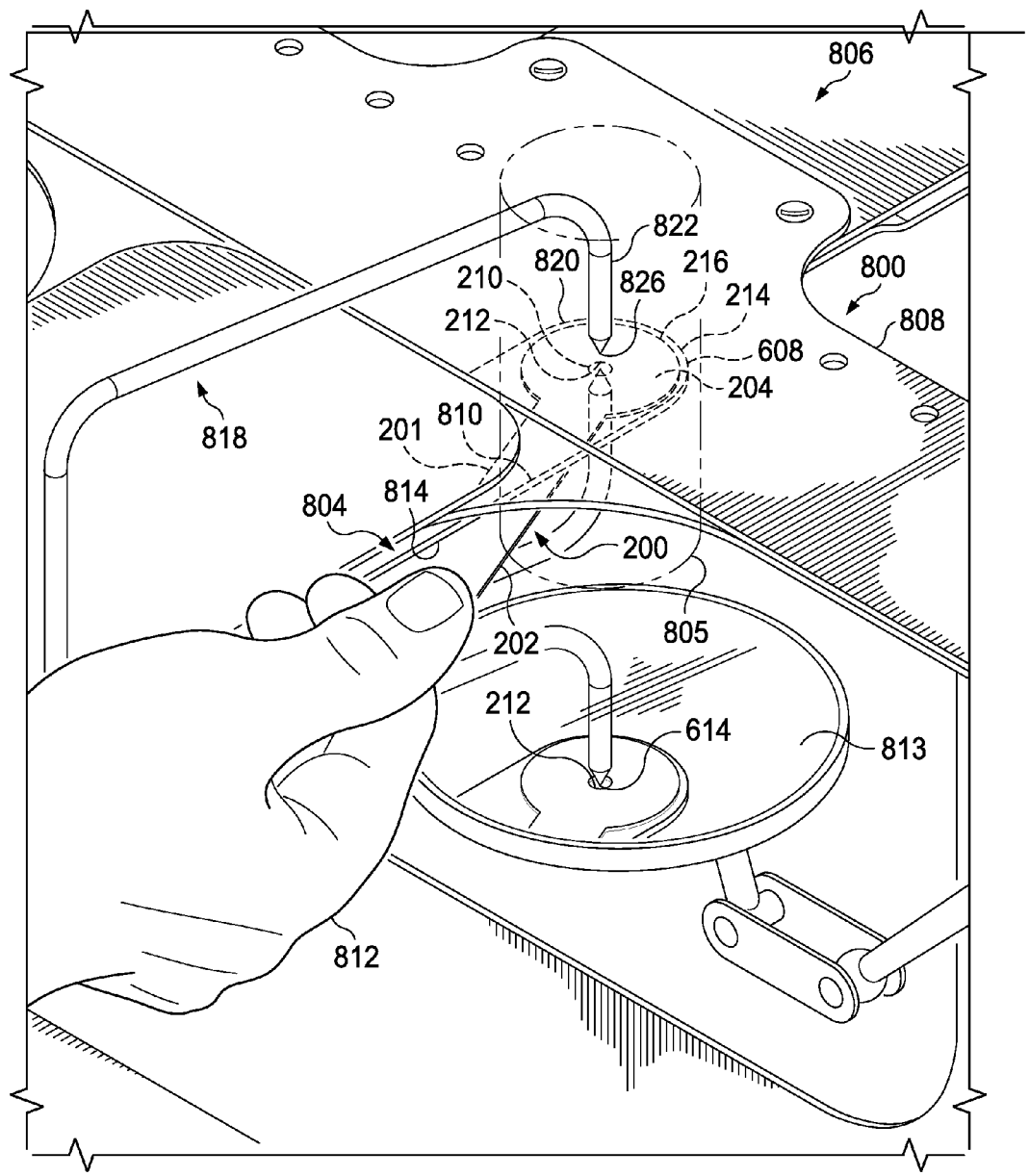
FIG. 8 is an illustration of a measurement tool used to identify a location for a hole in accordance with an illustrative example.

Turning now to FIG. 8, an illustration of a measurement tool used to identify a location for a hole is depicted in accordance with an illustrative example. In FIG. 8, part 800, part 802, and part 804 are parts in stackup of parts 806. A hole may need to be drilled in part 800, part 802, and part 804 to connect these parts to each other in stackup of parts 806. Identifying a correct location for this hole may be important to the design of the structure into which stackup of parts 806 is to be installed.

In this illustrative example, a hole is to be drilled in stackup of parts 806 within virtual volume 805, which intersects the stackup and whose radius is greater than or equal to the required minimum edge distance for the hole. Virtual volume 805 has a symmetry axis oriented in the direction that the parts in the stackup of parts are stacked and concentric with the hole to be drilled. The hole to be drilled should be located so that edges of part 800, part 802, and part 806 are either outside of virtual volume 805 or coextensive with the outer surface thereof.

However, as depicted, a portion of part 804 extends underneath both a portion of part 800 and a portion of part 802 within virtual volume 805. Identifying a location for the hole that has a required minimum edge distance from edge 806 of part 800, edge 808 of part 802, and edge 810 of part is now more complicated since visual access to at least some of the parts is limited. In particular, the portion of edge 810 of part 804 that extends underneath part 800 and part 802 within virtual volume 805 may not be easily visible to operator 812.

Consequently, operator 812 may use mirror 813 in addition to measurement tool 201 from FIG. 2 to identify the location for the hole. As depicted, operator 812 places measurement tool 201 on bottom surface 814 of part 804 instead of top surface 816 of part 800.

In this illustrative example, circular section 204 of measurement tool 201 is seen in phantom on bottom surface 814 of part 804. Circular section 204 of measurement tool 201 is associated with part 804, part 802, and part 800 such that edge 214 of circular section 204 is positioned within or tangent with edge 810 of part 804 on bottom surface 814 of part 804.

Operator 812 uses mirror 813 to confirm that circular section 204 of measurement tool 201 is completely contained within edge 810 of part 804 or is tangent thereto in this illustrative example. In particular, operator 812 may use the reflection of circular section 204 and edge 810 of part 804 in mirror 813 to determine whether circular section 204 is completely contained within edge 810 of part 804. In this manner, operator 812 may not need to directly view circular section 204 on bottom surface 814 of part 804.

In other illustrative examples, mirror 813 may be optional. For example, in some cases, operator 812 may rely on touch to determine whether edge 216 of circular section 204 in measurement tool 201 is within or tangent to edge 810 of part 804. In particular, operator 812 may use touch to ensure that circular section 204 does not extend past edge 810 of part 804.

In this illustrative example, part 802 may be large enough and edge 808 of part 802 may extend far enough such that an additional measurement with respect edge 808 of part 802 may not be needed.

In this illustrative example, marking tool 818 may be used to mark a location for a hole to be drilled in stackup of parts 806. In this illustrative example, marking tool 818 has first probe 820 and second probe 822. In this view, the reflection of first probe 820 is seen in mirror 813. First probe 820 and second probe 822 may each have ink at the ends thereof or may have sharpened points capable of producing light indentations in the material of the stackup.

First probe 820 may be inserted into hole 212 of measurement tool 201 and used to mark location 824 on bottom surface 814 of part 804. Location 824 may be a location for the center of the hole that is to be drilled. Drilling the hole at location 824 will ensure that the hole has the required minimum edge distance.

Second probe 822 may be positioned directly opposite of first probe 820. Second probe 822 may be used to mark location 826 on top surface 816 of part 800. Measurement tool 201 may then repositioned and placed over top surface 816 of part 800 to confirm that drilling a hole at location 826 will provide the required edge minimum distance for the hole.

Figure 9:
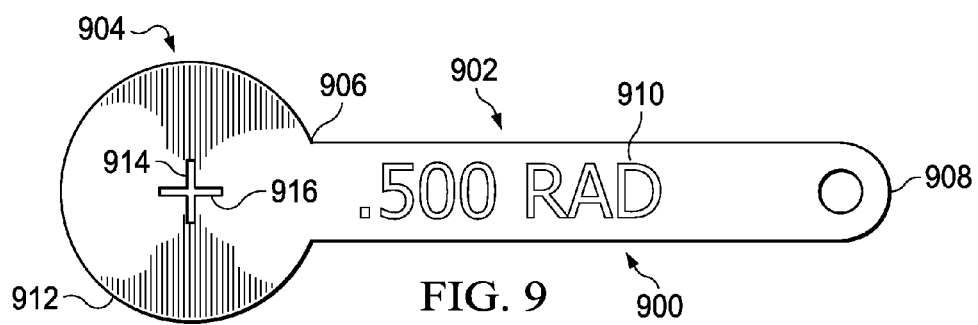
FIG. 9 is an illustration of a measurement tool having an indicator formed by two slots in accordance with an illustrative example.

Turning now to FIG. 9, an illustration of a measurement tool having an indicator formed by two slots is depicted in accordance with an illustrative example. Measurement tool 900 is another example of one implementation for a measurement tool. As depicted, measurement tool 900 includes elongate member 902 and circular section 904. Elongate member 902 has first end 906 and second end 908. Circular section 904 is coupled with first end 906 of elongate member 902.

In this illustrative example, circular section 904 has indicator 910 located centrally with respect to edge 912 of circular section 904. Indicator 910 takes the form of two intersecting slots, slot 914 and slot 916. The intersection of slot 914 and slot 916 is at the center of circular section 204, thereby providing a convenient way to mark the center of a hole to be drilled in a stackup of parts. For example, a marking tool may be inserted into and moved along each of slot 914 and slot 916 to form two lines on a part that intersect. The intersection of these two lines may be used as the location for the center for the hole that is to be drilled. These two intersecting lines may be referred to as cross-hair markings.

The illustrations in FIGS. 2-9 are not meant to imply physical or conceptual limitations to the manner in which an illustrative example may be implemented. Other components in addition to or in place of the ones illustrated may be used. Some components may be optional. Further, the different components shown in FIGS. 2-9 may be illustrative examples of how components described in block form in FIG. 10 below may be implemented as physical structures.

Figure 10:
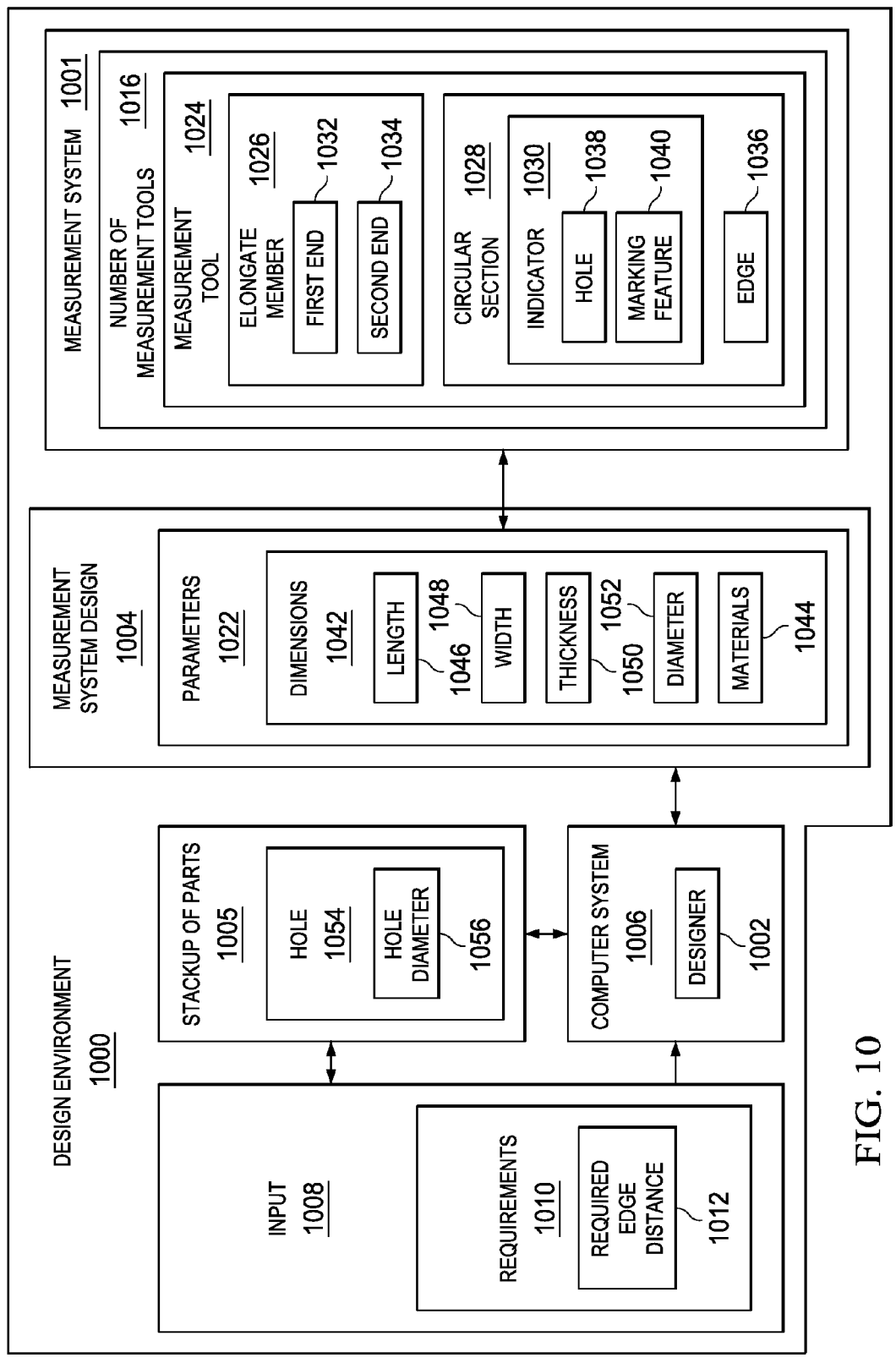
FIG. 10 is an illustration of a design environment in the form of a block diagram in accordance with an illustrative example.

With reference now to FIG. 10, an illustration of a design environment in the form of a block diagram is depicted in accordance with an illustrative example. In this depicted example, design environment 1000 includes designer 1002. Designer 1002 may be used to generate measurement system design 1004. Measurement system design 1004 is an example of a design for measurement system 1001.

Measurement system 1001 may be used to identify a location for a hole in a stackup of parts, such as stackup of parts 1005. Measurement system 200 in FIGS. 2-3 and measurement system 400 in FIG. 4 are examples of implementations for measurement system 1001.

In this illustrative example, designer 1002 may be implemented using hardware, software, or a combination of the two. When software is used, operations performed by designer 1002 may be implemented in program code configured to be run on a processing unit. When hardware is employed, the hardware includes circuits that operate to perform the operations in designer 1002.

In this illustrative example, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations.

Examples of programmable logic devices include, but are not limited to, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

Designer 1002 may be implemented using computer system 1006 in this illustrative example. Computer system 1006 is comprised of one or more computers. When more than one computer is present in computer system 1006, those computers may be in communication with each other using a communications medium such as a network.

As depicted, measurement system design 1004 may be generated using input 1008. Input 1008 may include requirements 1010. In this illustrative example, requirements 1010 may define required edge distance 1012. Required edge distance 1012 is the required distance from a center of a hole that is drilled in a part to the edge of that part.

In some cases, required edge distance 1012 is a precise edge distance that is required. In other words, a hole that is to be drilled having required edge distance 1012 may need to be drilled having an edge distance that is equal to required edge distance 1012 within selected tolerances. In other illustrative examples, required edge distance 1012 may be a minimum edge distance that is required. In other words, a hole that is to be drilled having required edge distance 1012, in these examples, may need to be drilled having an edge distance that is equal to, within selected tolerances, or greater than required edge distance 1012.

In this illustrative example, requirements 1010 and, in particular, required edge distance 1012 may be defined based on a number of different factors. For example, required edge distance 1012 may be defined based on engineering requirements, regulatory requirements, design standards, safety standards, other types of requirements or rules, or some combination of the above.

As depicted, measurement system 1001 may include number of measurement tools 1016. As used herein, a "number of" items means one or more items. In this manner, number of measurement tools 1016 may be one or more measurement tools.

Measurement tool 1024 is an example of one of number of measurement tools 1016. As depicted, measurement tool 1024 includes elongate member 1026, circular section 1028, and indicator 1030. Elongate member 1026 has first end 1032 and second end 1034.

Circular section 1028 extends from first end 1032 of elongate member 1026. In particular, circular section 928 may be associated with elongate member 1026 at first end 1032 of elongate member 1026. Circular section 1028 has edge 1036 that is configured to be positioned relative to a number of parts in a stackup of parts.

Additionally, indicator 1030 is located centrally in circular section 1028 of measurement tool 1024. In this illustrative example, indicator 1030 may take various forms. For example, indicator 1030 may be selected from one of hole 1038 and marking feature 1040.

The size and/or shape of hole 1038 may be configured to receive a marking tool. The marking tool may be, for example, without limitation, a pen, a marker, or some other type of writing instrument. In other illustrative examples, the marking tool may be a routing tool, a drill, a laser pointing device, or some other type of marking device.

Marking feature 1040 may be, for example, a feature that may be used to mark a location on a part overlapped by marking feature 1040. As one illustrative example, marking feature 1040 may be a sharp point. In some cases, marking feature 1040 may be a marking on circular section 1028. This marking may be used as a guide for a laser pointing device.

Marking feature 1040 may be a dot on circular section 1028 at the center of circular section 1028 instead of hole 1038. This dot may be used as a guide for a laser pointing device. For example, when measurement tool 1024 has been placed over a part in stackup of parts 1005, a laser pointing device may be positioned such that a laser beam generated by the laser pointing devices is pointed at the dot. The laser pointing device may be configured such that the laser beam remains pointed at the location on the part that is directly under the dot even when measurement tool 1024 is taken off of the part.

In these illustrative examples, parameters 1022 for number of measurement tools 1016 may include dimensions 1042 and material composition 1044 for measurement tool 1024. Dimensions 1042 may include, for example, without limitation, length 1046 and width 1048 for elongate member 1026 of measurement tool 1024. Dimensions 1042 also may include thickness 1050 for measurement tool 1024. Additionally, dimensions 1042 may include diameter 1052 for circular section 1028.

Length 1046 and width 1048 of elongate member 1026 may be selected such that elongate member 1026 may be held by a human operator. Of course, other factors may go into the selection of length 1046 and width 1048. In a similar fashion, thickness 1050 may be selected based on material composition 1044 used for measurement tool 1024.

In this illustrative example, diameter 1052 may be based on requirements 1010 and, in particular, requirements 1010 specifying required edge distance 1012. For example, diameter 1052 may be selected such that the radius of circular section 1028 is equal to required edge distance 1012 within selected tolerances. Of course, in other illustrative examples, parameters 1022 may include a radius for circular section 1028 instead of diameter 1052.

As one illustrative example, required edge distance 1012 may be specified based on engineering standards for hole 1054 to be formed in stackup of parts 1005. For example, hole 1054 may need to be formed having hole diameter 1056. The size of hole diameter 1056 may then determine required edge distance 1012. Required edge distance 1012 may then, in turn, determine diameter 1052 for circular section 1028.

In these illustrative examples, material composition 1044 for measurement tool 1024 may include a material selected from one of, for example, without limitation, steel, aluminum, polycarbonate, plastic, metal, a metal alloy, copper, titanium, some other type of material, or some combination of the above. The particular material used may depend on the environment in which measurement tool 1024 is to be used, a desired durability for measurement tool 1024, and/or the type of marking tool that will be used with hole 1038 in circular section 1028. In some cases, the materials that make up material composition 1044 may be specified in requirements 1010.

With measurement system design 1004, measurement system 1001 comprising number of measurement tools 1016 may be manufactured. These measurement tools may then be used in identifying locations for the centers of holes to be drilled into stackups of parts. In some cases, number of measurement tools 1016 may be used to verify that holes that have already been drilled have the required edge distances.

The illustration of design environment 1000 is not meant to imply physical or architectural limitations to the manner in which a design environment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative example.

For example, required edge distance 1012 may be indirectly based on the size of the fastener system to be installed in the hole. In other words, a diameter of a fastener system may be used to select required edge distance 1012. Further, in other illustrative examples, parameters 1022 may include other parameters in addition to and/or in place of the ones described above.

Figure 11:
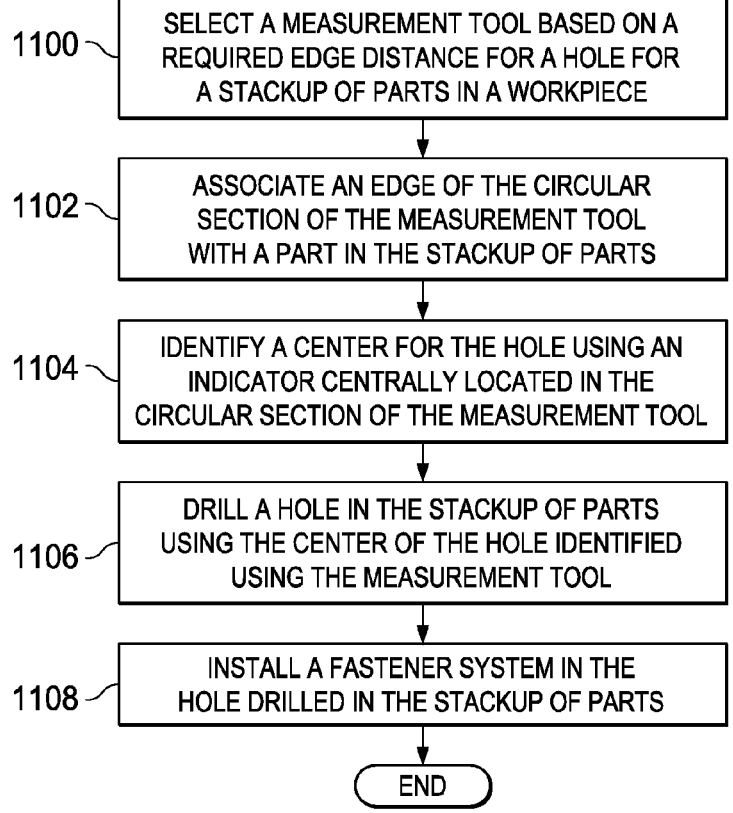
FIG. 11 is an illustration of a flowchart of a process identifying a location for a hole for a stackup of parts in accordance with an illustrative example.

Turning now to FIG. 11, an illustration of a flowchart of a process for identifying a location for a hole for a stackup of parts is depicted in accordance with an illustrative example. The process illustrated in FIG. 11 may be implemented in, for example, manufacturing environment 100 in FIG. 1 to identify locations for holes in components, such as stackup of parts 106 in FIG. 1. The process may be performed using measurement tool 201 in FIG. 2 or measurement system 400 in FIG. 4.

The process begins by selecting a measurement tool based on a required edge distance for a hole for a stackup of parts in a workpiece (operation 1100). The measurement tool comprises an elongate member having a circular section extending from an end of the elongate member. The circular section may have a radius substantially equal to the required edge distance within selected tolerances. In this illustrative example, the hole may or may not already be present in the stackup of parts, depending on the particular implementation.

The process associates an edge of the circular section of the measurement tool with a part in the stackup of parts (operation 1102). Operation 1102 may be performed by positioning the circular section such that the edge of the circular section is substantially tangent to an edge of the part without any portion of the circular section extending past the edge of the part.

The process then identifies a center for the hole using an indicator centrally located in the circular section of the measurement tool (operation 1104). Thereafter, a hole may be drilled in the stackup of parts using the center of the hole identified using the measurement tool (operation 1106). A fastener system is then installed in the hole drilled in the stackup of parts (operation 1108) with the process terminating thereafter.

Identifying the center of the hole may be performed in a number of different ways. For example, when the indicator is a hole, a marking tool may be used to mark the center of the hole to be drilled. In other illustrative examples, when the indicator is a marking feature, the marking feature may generate a mark that indicates the center of the hole in the stackup of parts. In particular, the center of the hole on the part in the stackup of parts may be marked using the marking feature.

In other illustrative examples, the center of the hole may be identified using a marking tool, a caliper, or another similar device when the surface on which the center of the hole is to be marked is not as easily accessible by an operator. For example, the stackup of parts may be placed between a first probe and a second probe of a marking tool.

The first probe may be aligned with the indicator of the measuring tool on the first side of the stackup of parts. The second probe may contact the second side of the stackup of parts such that the second probe in the marking tool indicates the location of the center of the hole to be drilled in the stackup.

Figure 12:
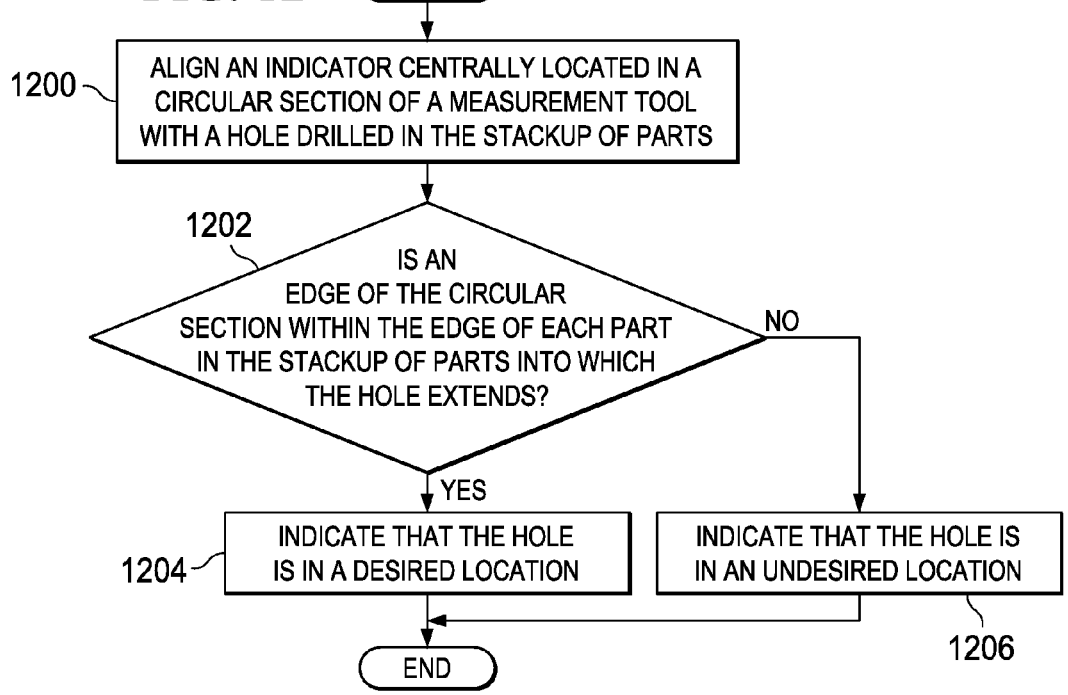
FIG. 12 is an illustration of a flowchart of a process for verifying the location of a hole drilled in a stackup of parts in accordance with an illustrative example.

Turning now to FIG. 12, an illustration of a flowchart of a process for verifying the location of a hole drilled in a stackup of parts is depicted in accordance with an illustrative example. The process illustrated in FIG. 12 may be implemented using, for example, measurement tool 700 in FIG. 7.

The process begins by aligning a circular section of a measurement tool with a hole drilled in the stackup of parts (operation 1200). In operation 1200, the circular section may be positioned over the hole such that a circular marking on the circular section aligns with the hole. A determination is made as to whether an edge of the circular section is within the edge of each part in the stackup of parts into which the hole extends (operation 1202).

If the edge of the circular section is within the edge of each part in the stackup of parts into which the hole extends, an indication is made that the hole is in a desired location (operation 1204) with the process terminating thereafter. Otherwise, an indication is made that the hole is in an undesired location (operation 1206) with the process terminating thereafter.

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in some illustrative examples, a hole may already be formed in the stackup of parts. In this situation, the operations may be performed to verify whether the center of the hole identified for the hole matches an actual center of the hole as drilled in the stackup of parts.

Figure 13:
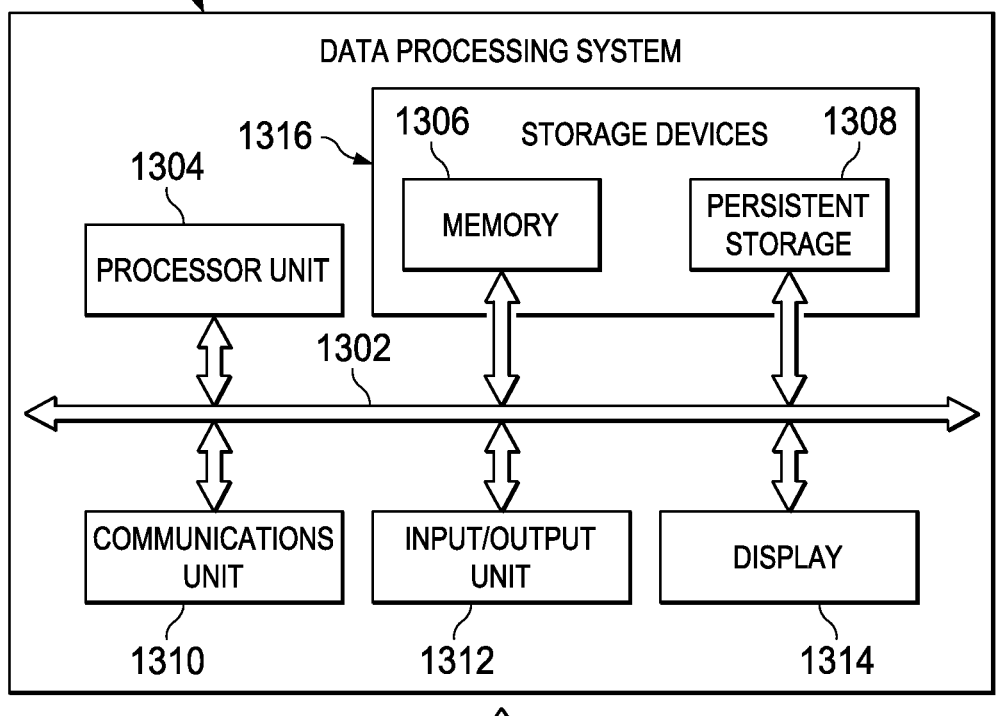
FIG. 13 is an illustration of a data processing system in accordance with an illustrative example.
Figure 13:
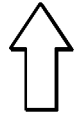
Figure 13:
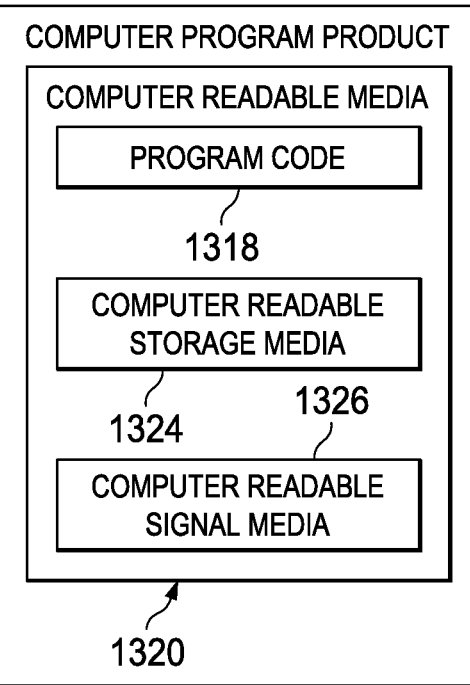

Turning now to FIG. 13, an illustration of a data processing system is depicted in accordance with an illustrative example. Data processing system 1300 may be used to implement computer system 1006 in FIG. 10. In this illustrative example, data processing system 1300 includes communications framework 1302, which provides communications between processor unit 1304, memory 1306, persistent storage 1308, communications unit 1310, input/output unit 1312, and display 1314. In this example, communication framework may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, data, program code in functional form, and/or other suitable information either on a temporary basis and/or a permanent basis. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications framework 1302. The processes of the different examples may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different examples may be embodied on different physical or computer readable storage media, such as memory 1306 or persistent storage 1308.

Program code 1318 and computer readable media 1320 form computer program product 1322 in these illustrative examples. In one example, computer readable media 1320 may be computer readable storage media 1324 or computer readable signal media 1326.

In these illustrative examples, computer readable storage media 1324 is a physical or tangible storage device used to store program code 1318 rather than a medium that propagates or transmits program code 1318.

The different components illustrated for data processing system 1300 are not meant to provide architectural limitations to the manner in which different examples may be implemented. The different illustrative examples may be implemented in a data processing system including components in addition to and/or in place of those illustrated for data processing system 1300. Other components shown in FIG. 13 can be varied from the illustrative examples shown. The different examples may be implemented using any hardware device or system capable of running program code 1318.

Figure 14:
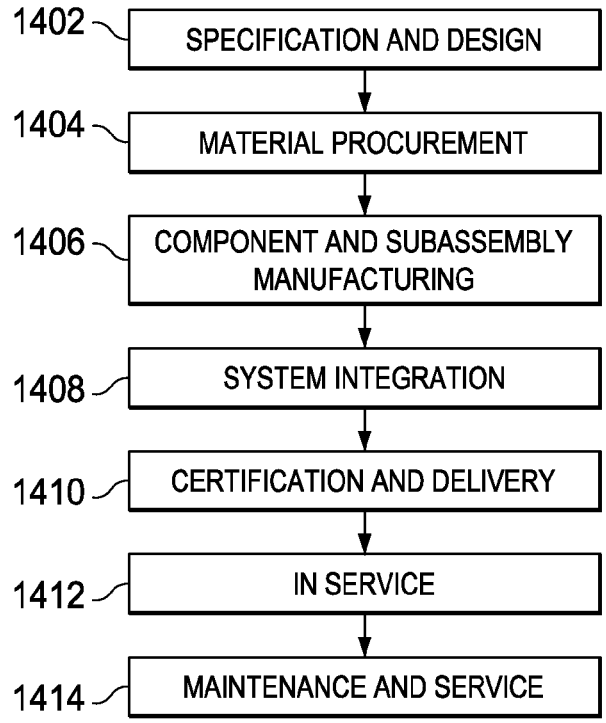
FIG. 14 is an illustration of an aircraft manufacturing and service method in accordance with an illustrative example.
Figure 15:
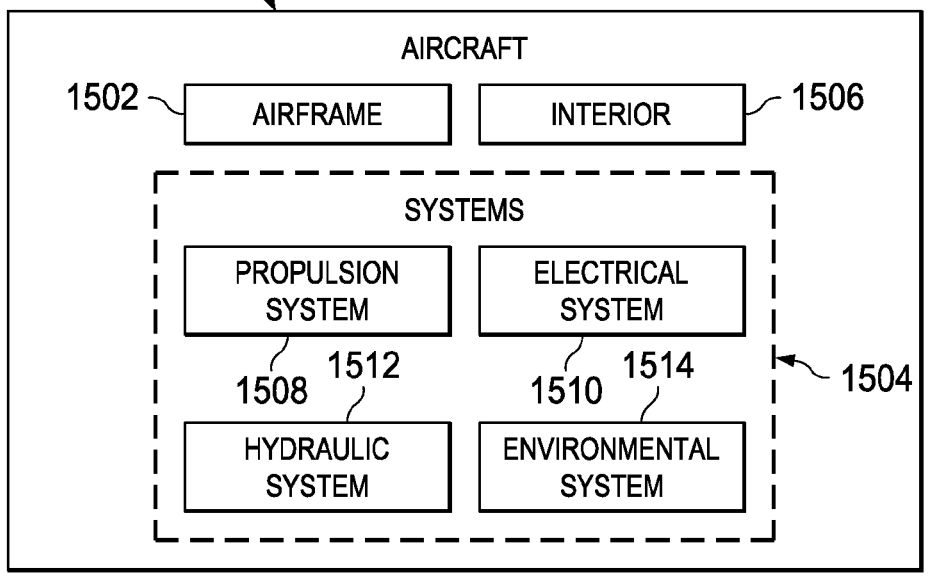
FIG. 15 is an illustration of an aircraft depicted in which an illustrative example may be implemented.

Illustrative examples of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative example. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative example may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1400 in FIG. 14.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. For example, a measurement system, in accordance with an illustrative example, may be used to identify locations of holes during component and subassembly manufacturing 1406 to manufacture assemblies or subassemblies in which a stackup of parts are connected to each other. Additionally, the measurement system, in the illustrative examples, also may be used during system integration when different components are connected to each other. Further, during maintenance and service 1414, a measurement system may be used when performing maintenance, refurbishment, upgrades, and other operations in which parts may be connected to each other or otherwise inspected. The use of a number of the different illustrative examples may substantially expedite the assembly of and/or reduce the cost of aircraft 1500.

Thus, the illustrative examples provide a method and apparatus for processing a stackup of parts. In particular, an illustrative example may be used to identify a location of a hole for a stackup of parts. With a measurement tool constructed in accordance with an illustrative example, identifying a location of a hole for a stackup of parts may be performed more easily as compared to currently used processes.

For example, looking at markings on a ruler to determine where the center of the hole should be located may be performed more easily using a measurement tool in accordance with an illustrative example.

With the measurement tool, in accordance with an illustrative example, this identification may be made by aligning the edge of the tool with the perimeter of the stackup of parts. Further, the illustrative examples may more easily identify a location for a hole in the stackup of parts when the location is less accessible to an operator and may not be as visible as desired.

Thus, with a measurement tool, in accordance with an illustrative example, it may be easier to identify holes for a stackup of parts. As a result, when processing thousands or hundreds of thousands of stackups of parts, the identification of holes, drilling of holes, and installation of fasteners may be performed more quickly and easily in accordance with an illustrative example.

The description of the different illustrative examples has been presented for purposes of illustration and description, and is not intended to be exhaustive or limited to the examples in the form disclosed. Many modifications and variations will be apparent to those of ordinary skill in the art.

Although the illustrative examples for an illustrative example are described with respect to an aircraft, an illustrative example may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable objects.

Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for processing a stackup of parts, the method comprising:
   identifying a required edge distance for a hole for the stackup of the parts;
   selecting a measurement tool based on the required edge distance identified for the hole, wherein the measurement tool comprises a circular section having an edge and an indicator centrally located with respect to the edge of the circular section;
   associating the edge of the circular section of the measurement tool with a part in the stackup of the parts; and
   identifying a location on the part for a center of the hole for the stackup of the parts using the indicator.

2. The method of claim 1 further comprising:
   drilling the hole in the stackup of the parts using the location on the part identified using the indicator of the measurement tool.

3. The method of claim 2 further comprising:
   installing a fastener system in the hole drilled in the stackup of the parts.

4. The method of claim 1, wherein identifying the location on the part for the center of the hole for the stackup of the parts using the indicator comprises:
   identifying a portion of the part exposed by a hole in the circular section of the measurement tool as the location on the part for the center of the hole for the stackup of the parts, wherein the hole is the indicator.

5. The method of claim 1, wherein identifying the location on the part for the center of the hole for the stackup of the parts using the indicator further comprises:
   marking the location on the part in the stackup of the parts using a marking tool.

6. The method of claim 1, wherein selecting the measurement tool based on the required edge distance identified for the hole comprises:
   selecting the measurement tool having the circular section with a radius that substantially equals the required edge distance within selected tolerances from a number of measurement tools that form a measurement system.

7. The method of claim 1, wherein associating the edge of the circular section of the measurement tool with the part in the stackup of the parts comprises:
   placing the circular section of the measurement tool on a surface of the part such that the edge of the circular section is substantially tangent to an edge of the part within selected tolerances and does not extend past the edge of the part.

8. The method of claim 1, wherein associating the edge of the circular section of the measurement tool with the part in the stackup of the parts comprises:
   placing the circular section of the measurement tool on a surface of the part such that the circular section is located completely within an edge of the part within selected tolerances.

9. The method of claim 1, wherein identifying the required edge distance for the hole for the stackup of the parts comprises:
   identifying a minimum edge distance required between the center of the hole for the stackup of the parts and an edge of the part in the stackup of the parts based on at least one of engineering requirements, regulatory requirements, design standards, and safety standards.

10. The method of claim 1, wherein associating the edge of the circular section of the measurement tool with the part in the stackup of the parts comprises:
    placing the circular section of the measurement tool on a bottom surface of the part in the stackup of the parts such that the circular section of the measurement tool is completely within an edge of the part, wherein the indicator is a hole in the circular section; and
    positioning a mirror relative to the part such that a reflection of the circular section of the measurement tool is visible in the mirror.

11. The method of claim 10, wherein the step of identifying the location on the part indicated by the indicator in the circular section of the measurement tool as the location for the center of the hole for the stackup of the parts comprises:
    marking the location on the part exposed by the hole in the circular section of the measurement tool as the location for the center of the hole using the reflection of the circular section in the mirror.

\* \* \* \* \*